(12) United States Patent
Hwang et al.

(10) Patent No.: US 9,900,403 B2
(45) Date of Patent: Feb. 20, 2018

(54) METHOD AND SERVER FOR ASSIGNING RELATIVE ORDER TO MESSAGE BY USING VECTOR CLOCK AND DELIVERING THE MESSAGE BASED ON THE ASSIGNED RELATIVE ORDER UNDER DISTRIBUTED ENVIRONMENT

(71) Applicant: TMAXSOFT. CO., LTD., Gyeonggi-do (KR)

(72) Inventors: Seung Wook Hwang, Gyeonggi-do (KR); Dong Hwan Seo, Seoul (KR); Myung Sik Sung, Seoul (KR); Seung Hoon Han, Gyeonggi-do (KR)

(73) Assignee: TMAXSOFT. CO., LTD., Gyeonggi-do (KR)

( * ) Notice: Subject to any disclaimer, the term of this patent is extended or adjusted under 35 U.S.C. 154(b) by 0 days.

(21) Appl. No.: 14/927,436

(22) Filed: Oct. 29, 2015

(65) Prior Publication Data
US 2016/0337470 A1 Nov. 17, 2016

(30) Foreign Application Priority Data
May 14, 2015 (KR) ........................ 10-2015-0067664

(51) Int. Cl.
G06F 15/16 (2006.01)
H04L 29/08 (2006.01)
H04L 12/58 (2006.01)

(52) U.S. Cl.
CPC ............ *H04L 67/325* (2013.01); *H04L 51/04* (2013.01); *H04L 67/10* (2013.01)

(58) Field of Classification Search
CPC ....... H04L 29/06; H04L 41/06; H04L 67/101; G06F 11/3414; G06F 15/16
USPC .................................. 709/202, 206; 717/131
See application file for complete search history.

(56) References Cited

U.S. PATENT DOCUMENTS

| | | | | |
|---|---|---|---|---|
| 5,630,161 A | * | 5/1997 | Branco | G01S 7/292 712/36 |
| 6,904,553 B1 | * | 6/2005 | Brown | G01R 31/318594 714/729 |
| 7,779,393 B1 | * | 8/2010 | Manovit | G06F 11/2242 711/141 |
| 2005/0038806 A1 | * | 2/2005 | Ma | G06F 9/546 |
| 2006/0085507 A1 | * | 4/2006 | Zhao | G06Q 10/10 709/206 |

(Continued)

OTHER PUBLICATIONS

Holzer, et al. "Abstracting context in event-based software." Transactions on Aspect-Oriented Software Development IX. Springer Berlin Heidelberg, 2012. 123-167.

(Continued)

*Primary Examiner* — Tesfay Yohannes
(74) *Attorney, Agent, or Firm* — Husch Blackwell LLP (57) ABSTRACT

A method for assigning relative order to messages by using vector clocks under a distributed server environment is disclosed. The method includes the steps of: (a) a server assigning a vector clock to a message and storing the message to which the vector clock is assigned if the message required to be assigned relative order is acquired through a network; and (b) the server transmitting an increased vector clock to one or more other servers connected with itself through the network and supporting said other servers to update their vector clocks by referring to the increased vector clock.

10 Claims, 5 Drawing Sheets

(56) References Cited

U.S. PATENT DOCUMENTS

| | | | | |
|---|---|---|---|---|
| 2008/0244341 | A1* | 10/2008 | Yoshihara | G01B 31/318577 714/726 |
| 2010/0266003 | A1* | 10/2010 | Patino-Studencka | G01S 5/0221 375/224 |
| 2014/0247983 | A1* | 9/2014 | MacInnis | H04N 19/14 382/166 |
| 2015/0172412 | A1* | 6/2015 | Escriva | G06F 17/30091 709/202 |
| 2015/0363303 | A1* | 12/2015 | Argenti | G06F 9/4856 717/131 |

OTHER PUBLICATIONS

Mouftah, "Distributed discrete event simulation for communication networks." Selected Areas in Communications, IEEE Journal on 8.9 (1990): 1723-1734.

Baldoni, et al. "Fundamentals of distributed computing: A practical tour of vector clock systems." IEEE Distributed Systems Online 2 (2002).

* cited by examiner

METHOD AND SERVER FOR ASSIGNING RELATIVE ORDER TO MESSAGE BY USING VECTOR CLOCK AND DELIVERING THE MESSAGE BASED ON THE ASSIGNED RELATIVE ORDER UNDER DISTRIBUTED ENVIRONMENT

CROSS REFERENCE TO RELATED APPLICATION

This application claims priority to and incorporates herein by reference all disclosure in Korean Patent Application No. 10-2015-0067664 filed May 14, 2015.

FIELD OF THE INVENTION

The present invention relates to a method and a server for assigning relative order to a message by using a vector clock and delivering the message based on the assigned relative order under a distributed server environment; and more particularly, to the method and the server for performing (i) a process for assigning a current vector clock maintained by the server to a message if acquired through a network, and transmitting an updated vector clock acquired by increasing the current vector clock to at least one of other servers connected with the server through the network to thereby support vector clocks currently maintained by said other servers to be updated by referring to the transmitted updated vector clock; and (ii) a process for transmitting information on a vector clock corresponding to a message in the earliest relative order, i.e., a specific message, among at least one of messages stored in the server, if a request for a message is received from a client by the server, to said other servers connected with the server through the network, asking said other servers whether there is any message with a vector clock in the earlier relative order than the specific message in said other servers, and then providing the specific message to the client, if there is no message with a vector clock in earlier relative order than the specific message in said other server.

BACKGROUND OF THE INVENTION

Java Message Service (JMS) is a Java API through which Java program transmits and receives data through a network, and performs functions of keeping one or more messages sent by a client in a server and delivering the messages to other clients in regular order.

The JMS allows a plurality of clients that transmit and receive messages to communicate asynchronously with one another without any direct connections thereamong. Accordingly, the performance of the clients may be improved because a client which intends to transmit a message may perform another task freely without waiting until the message is processed or even until the message is delivered.

In the JMS, contrary to a synchronous RPC service, a client does not have to know who processes the message or where a service is located. The client only knows only a queue (a destination of a message in a point-to-point model) or a topic (a destination of a message in a publish-subscribe model) to which a message(s) is sent. Accordingly, it is robust against a change of a configuration of a network such as a change of an IP address or a port.

Since the message is stored and then delivered asynchronously according to the JMS, the JMS can ensure that the message will be surely delivered someday. Therefore, the IP address and the port designated at the time of transmitting the message do not have to wait.

As such, while providing how to deliver messages in the stored order in a single-server environment, the JMS cannot provide effective technology which may specify the order of transmitting messages if the single-server environment is expanded to a distributed server environment.

The simplest method for assigning the order of messages under the distributed server environment is to control an assigning part for assigning absolute order to all messages. However, the method has a drawback in that the processing load of the assigning part is increased as the scale of the distribution server environment becomes larger.

Accordingly, a technology of transmitting messages effectively is required even under the large-scale distributed server environment by deciding relative order of messages and ensuring that clients receive messages according to the relative order.

SUMMARY OF THE INVENTION

It is an object of the present invention to solve all the aforementioned problems.

It is another object of the present invention to provide a technology of transmitting messages effectively even under the large-scale distributed server environment by deciding relative order of messages under the distributed server environment and ensuring that clients receive the messages according to the relative order.

It is still another object of the present invention to provide the technology of transmitting messages effectively even under the large-scale distributed server environment by replacing the messages sent to a server(s) by a client(s) with vector clock events in the distributed JMS environment and then assigning relative order to the messages.

In accordance with one aspect of the present invention, there is a method for assigning relative order to messages by using vector clocks under a distributed server environment, including the steps of: (a) a server assigning a vector clock to a message and storing the message to which the vector clock is assigned if the message required to be assigned relative order is acquired through a network; and (b) the server transmitting an increased vector clock to one or more other servers connected with itself through the network and supporting said other servers to update their vector clocks by referring to the increased vector clock.

In accordance with another aspect of the present invention, there is a method for delivering messages in relative order by using vector clocks under a distributed server environment, including the steps of: (a) a server transmitting information on a vector clock corresponding to a specific message with a vector clock in the earliest relative order among at least one of its messages to other servers connected with itself through a network, if receiving a request for a message from a client, and asking said other servers whether there is any message with a vector clock in earlier relative order than the specific message in at least one of said other servers; and (b) the server providing the specific message to the client, if it is determined that there is no message with a vector clock in earlier relative order than the specific message in at least one of said other servers.

In accordance with still another aspect of the present invention, there is a server for assigning relative order to messages by using vector clocks in a distributed server environment, including: a handler processor; a communication part for communicating with one or more other servers connected with itself through a network; and a storage unit for storing one or more messages and vector clocks; wherein the handler processor (i) assigns a vector clock stored in the storage unit to a message to which the relative order is required to be assigned, if the message is acquired through the network, and (ii) causes the communication part to transmit an increased vector clock to said other servers connected with the server through the network and then supports said other servers to update their vector clocks by referring to the increased vector clock.

In accordance with still yet another aspect of the present invention, there is a server for delivering messages in relative order by using vector clocks in a distributed server environment, including: a handler processor; a communication part for communicating with one or more other servers connected through a network with itself; and a storage unit for storing one or more messages and vector clocks; wherein the handler processor (i) allows the communication part to transmit information on a vector clock corresponding to a specific message with a vector clock in the earliest relative order among at least one of its messages stored in the storage unit to said other servers, if receiving a request for a message from a client, and asks said other servers whether there is any message with a vector clock in earlier relative order than the specific message in at least one of said other servers; and (ii) causes the communication part to provide the specific message to the client, if it is determined that there is no message with a vector clock in earlier relative order than the specific message in at least one of said other servers.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 1:
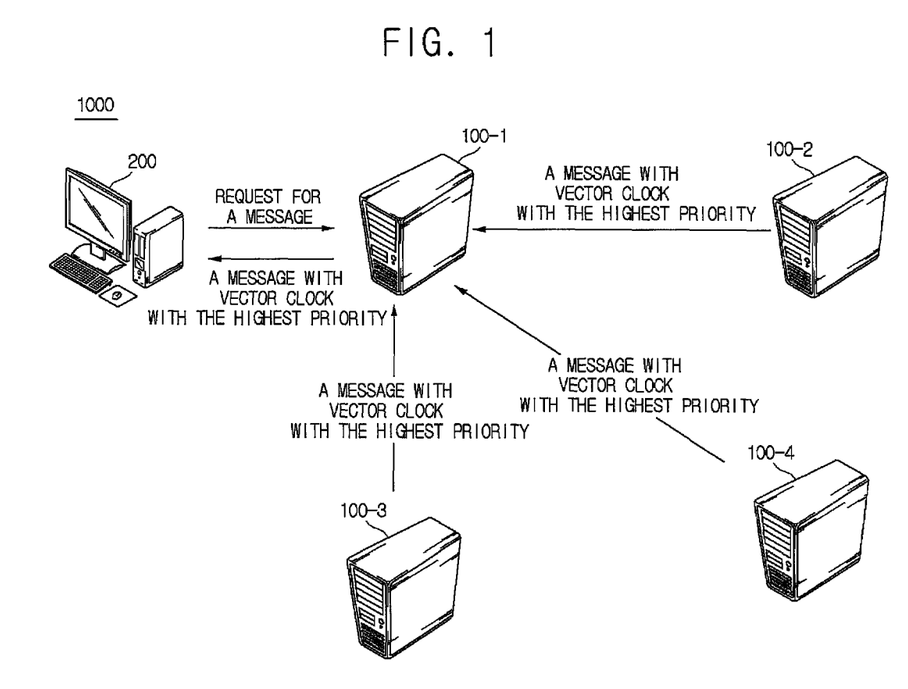
FIG. 1 is a concept diagram to roughly explain a method for transmitting a message according to relative order of messages under a distributed server system in accordance with one example embodiment of the present invention.

To allow those skilled in the art to the present invention to be carried out easily, the example embodiments of the present invention by referring to attached diagrams will be explained in detail as follows:

FIG. 1 is a concept diagram to roughly explain a method for transmitting a message according to relative order of messages under a distributed server system in accordance with one example embodiment of the present invention.

By referring to FIG. 1, each of multiple servers 100-1, 100-2, 100-3, and 100-4 in a distributed server system 1000 in accordance with one example embodiment of the present invention may receive a request for a message from a client. If the server 100-1 has received the request for the message, the server 100-1 may provide a message with the highest priority among messages stored in itself and those stored in the other servers 100-2, 100-3, and 100-4 connected through a network with itself to a client 200.

To do this, if a specific server 100-1 among the servers 100-1, 100-2, 100-3, and 100-4 acquires a message, the specific server may assign relative order to the message, and store the message to which the relative order is assigned. In accordance with one example embodiment of the present invention, a vector clock algorithm may be used to assign the relative order to the message. The specific server may increase a vector clock stored in a storage unit (not illustrated) therein, if the message is acquired, assign the increased vector clock to the message, and transmit information on the increased vector clock to other servers 100-2, 100-3, and 100-4. Said other servers, if receiving the vector clock information, may update their vector clocks by referring to the received vector clock. Thereafter, if a certain server 100-2 among the servers 100-1, 100-2, 100-3, and 100-4 acquires a new message from other servers 100-1, 100-3, and 100-4, the certain server 100-2 may increase the vector clock again and then assign the re-increased vector clock to the newly acquired message, and transmit the re-increased vector clock to said other servers 100-1, 100-3, and 100-4 to allow their vector clocks to be updated.

Then, if a request for a message is inputted to the specific server 100-1 from the client 200, the specific server 100-1 may transmit information on its vector clock corresponding to a specific message with the earliest relative order among the messages stored in the specific server 100-1 and ask whether there is any message with a vector clock in the earlier relative order than the specific message in the other servers 100-2, 100-3, and 100-4 connected through the network with itself. If there is no message with a vector clock in the earlier relative order than the specific message in the other servers 100-2, 100-3, and 100-4, the specific server 100-1 delivers the specific message to the client 200. However, if there is a certain message with a vector clock in the earlier relative order than the specific message in the other servers 100-2, 100-3, and 100-4, the specific server 100-1 may acquire the certain message from the corresponding server and provide it to the client 200. To deliver the specific message or the certain message explained above, the Java Message Service or JMS may be used. In the example embodiment, it was explained that the distributed server system 1000 consists of four servers but this is merely an example. That is, the number of servers included in the distributed server system 1000 may be greater or less.

The configuration and the operation of each server in the distributed server system 1000 will be explained below in more details.

Figure 2:
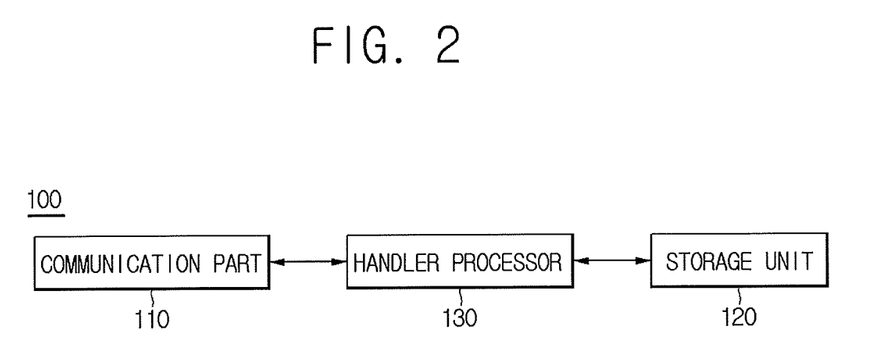
FIG. 2 is a block diagram showing a configuration of a server to assign relative order to messages by using vector clocks under the distributed server environment in accordance with one example embodiment of the present invention.

FIG. 2 is a block diagram showing a configuration of a server to assign relative order to messages by using vector clocks under the distributed server environment in accordance with one example embodiment of the present invention.

By referring to FIG. 2, a server 100 for assigning relative order to at least one message by using the vector clock algorithm under the distributed server environment in accordance with one example embodiment of the present invention includes a communication part 110, a storage unit 120, and a handler processor 130. For reference, the server 100 could be also any of the servers 100-1, 100-2, 100-3, and 100-4 as mentioned in FIG. 1.

The communication part 110 may communicate with at least one of other servers (not illustrated) connected with the server 100 through a network. As explained below, the communication part 110 may transmit or receive vector clocks with at least one of said other servers, or receive a message in the earliest relative order from the at least one of said other servers and transmit the message in the earliest relative order at a request of a client (not illustrated).

The storage unit 120 may store at least one of vector clocks managed by the server 100, those received from said other servers, and acquired messages. The storage unit 120 may be implemented with a variety of means. For example, it could be implemented in a memory such as ROM or RAM, hard disk drive (HDD), blur-ray disk (BD), etc. Besides, as an example of the storage unit 120, database for recording and managing vector clocks managed by the server 100, vector clocks received from other servers, acquired messages, etc. could be also considered. If the storage unit 120 includes database, the storage unit 120 may be implemented as a separate database server. In the case, the server 100 may also acquire the vector clocks, etc. by transmitting a query to the database server.

The handler processor 130 may control the communication part 110, and the storage unit 120 and also control all of assignment, management, transmission, and reception of vector clocks and transmission and reception of messages. In particular, if a message to which relative order is required to be assigned is acquired through the network, the handler processor 130 may assign a vector clock stored and currently maintained in the storage unit 120 to the acquired message and store the message with the assigned vector clock. More specifically, if a message, to which relative order is required to be assigned, is acquired through the network, the handler processor 130 may increase a vector clock by generating an internal event to the vector clock stored and currently maintained in the storage unit 120 by the vector clock algorithm and store them in the storage unit 120. Then, it may also assign the increased vector clock to the acquired message.

Brief explanation on a method for determining whether a message is required to be assigned relative order will be made before the further explanation on the operation of the handler processor 130.

Figure 3:
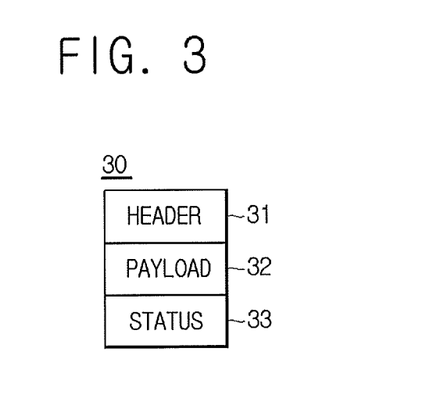
FIG. 3 is a drawing illustrating a packet structure of a message acquired in accordance with one example embodiment of the present invention.

FIG. 3 is a drawing illustrating a packet structure of the message in accordance with one example embodiment of the present invention.

By referring to FIG. 3, it could be found that a packet 30 of the message in accordance with one example embodiment of the present invention includes a header 31, a payload 32, and status information 33. The header 31 may include information for identifying a message type and the payload 32 may include data in the body of the message. The status information 33 may include information for determining whether the acquired message is required to be assigned relative order. For example, the status information 33 may include flag information which may indicate whether the message is required to be assigned the relative order. By referring to the status information 33, the handler processor 130 may determine whether the acquired message is required to be assigned the relative order.

Further, the handler processor 130 may allow the communication part 110 to transmit the increased vector clock to said other servers connected with the server 100 through the network and then support the vector clocks currently held by the respective other servers to be updated by referring to the increased vector clock. In other words, the communication part 110 may support each of said other servers connected with the server 100 through the network to generate a received event by transmitting the increased vector clock to said other servers. Herein, the communication part 110 may transmit the increased vector clock to said other servers in a multicast method. Each of said other servers may update and store the received vector clock in its storage unit (not illustrated) and then increase and store its vector clock. Thereafter, if a certain server among said other servers acquires a new message, the certain server may assign the relative order to the new message by increasing its vector clock again and then assigning both the re-increased vector clock of its own and the vector clock acquired from the server 100 to the new message.

Because the server 100 and said other servers basically have same configurations and functions, the operations performed when the server 100 acquires a vector clock from one of said other servers is also same. In short, if the server 100 acquires a vector clock at a certain status as a received event from a specific server among said other servers, the handler processor 130 may update the vector clock stored and maintained in the storage unit 120 by referring to the acquired vector clock at the certain status. More specifically, if information on the vector clock of the specific server is stored in the storage unit 120, the handler processor 130 may update the vector clock of the specific sever stored in the storage unit 120 and increase its own vector clock stored and maintained therein. If information on the vector clock of the specific server is not stored therein, the handler processor 130 may store the acquired vector clock at the certain status therein as a vector clock of the specific server and increase its own vector clock stored and maintained therein. After that, if a new message is acquired, the server 100 may increase its own vector clock stored in the storage unit 120 and assign its own increased vector clock and the vector clock of the specific server to the message.

The server 100 may transmit the message to a client according to the relative order assigned as shown above by a method as shown below.

If receiving a request for a message from a client, the handler processor 130 of the server 100 may allow the communication part 110 of the server 100 to transmit information on a vector clock corresponding to a message with a vector clock in the earliest relative order, i.e., a specific message, among at least one message stored in the storage unit 120 of the server 100 to other servers connected with the server 100 through the network. In other words, the server 100 which receives a request for the message from the client may support a vector clock of the specific message in the earliest relative order among vector clocks of its own messages to be compared with vector clocks of messages stored in said other servers by transmitting the information on the vector clock of the specific message in the earliest relative order among the vector clocks of its own messages to said other servers because it must transmit a message with a vector clock in the earliest relative order among all the messages stored in the server 100 and said other servers included in the distributed server system.

To do this, the handler processor 130 of the server 100 may ask said other servers whether there is any message with a vector clock in earlier relative order than the specific message stored in the storage unit 120 of the server 100.

Then, each of said other servers compares a vector clock of its own in the earliest relative order among vector clocks corresponding to its messages with that of the specific message received from the server 100.

If there is no message with a vector clock in earlier relative order than the specific message stored in the storage unit 120 of the server 100 in said other servers, each of said other servers may notify the server 100 of such information. In the case, the handler processor 130 of the server 100 may cause the communication part 110 to provide the specific message to the client. In the case as shown above, the server 100 may additionally set to the specific message a flag in a meaning of a status deliverable to the client. This is to prevent relative order of the vector clock the specific message has from being repeatedly determined if the client returns the specific message without using it. In the case, the returned specific message may be stored again in the storage unit 120. After that, if the client requests the specific message again, the handler processor 130 may cause the communication part 110 to provide the specific message stored in the storage unit 120 to the client without a course of determining the order of the vector clock again. In short, if the flag in the meaning of the deliverable status is set to the specific message, the handler processor 130 of the server 100 may cause the communication part 110 to provide the specific message to the client.

On the other hand, if there is any message, e.g., at least a certain message, with a vector clock in earlier relative order than the specific message stored in the storage unit 120 of the server 100 in a certain server among said other servers, the certain server may provide the certain message with a vector clock in earlier relative order than the specific message to the server 100. In other words, the handler processor 130 may allow the communication part 110 to acquire the certain message in earlier relative order from at least one, e.g., the certain server, among said other servers. At the time, the certain server may also provide information on the vector clock of the certain message to the server 100. If the server 100 receives two or more messages from at least two servers among said other servers, the server 100 may compare vector clocks of the messages with each other and finally deliver a message with the highest priority to the client.

As another example, to determine whether there is any message with a vector clock in earlier relative order than the specific message stored in the storage unit 120 in said other servers, the server 100 could also request each of said other servers to send each vector clock with the highest priority among vector clocks in each of said other servers. If each of said other servers sends its own vector clock with the highest priority in response to such a request, the server 100 could receive them and compare each of them with its own vector clock.

The configurations and the operations of servers for assigning relative order to messages by using vector clocks under the distributed server environment and transmitting and receiving the messages depending on the assigned order in accordance with one example embodiment of the present invention will be explained below. For reference, explanation in FIGS. 4 and 5 will be made by exemplarily considering the transmission and the reception of data between the servers 100-1 and 100-2 among the servers mentioned in FIG. 1, but it is similarly explained to other server combinations selected among the servers 1001, 100-2, 100-3, 100-4. Further, for convenience of explanation, it is assumed that a request for a message is made from a client to the server 100-1 in FIGS. 4 and 5 so that the servers other than the server 100-1 are mentioned as "other servers" stated in the claims but they are not limited thereto. If a request for a message is made from a client to the server 100-2, the servers other than the server 100-2 could be mentioned as "other servers" as stated in the claims.

Figure 4A:
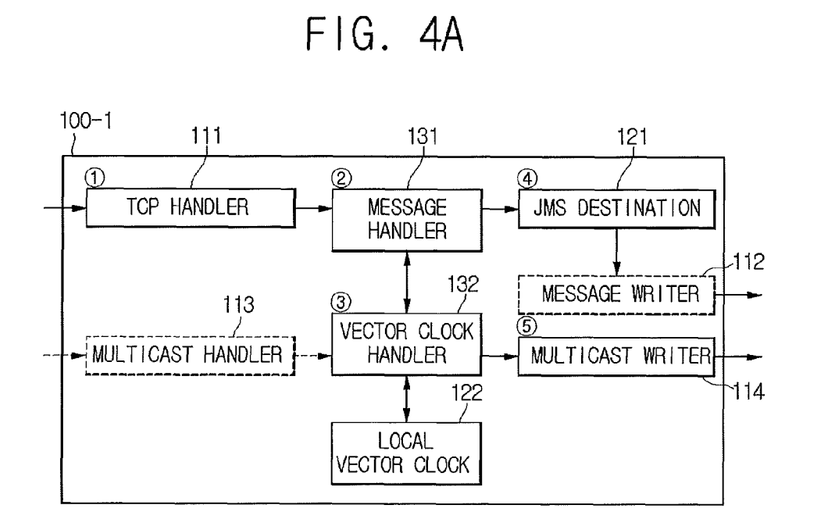
FIGS. 4A and 4B are block diagrams showing a course of assigning order to a JMS message by using a vector clock with a first server and a second one in accordance with one example embodiment of the present invention.
Figure 4B:
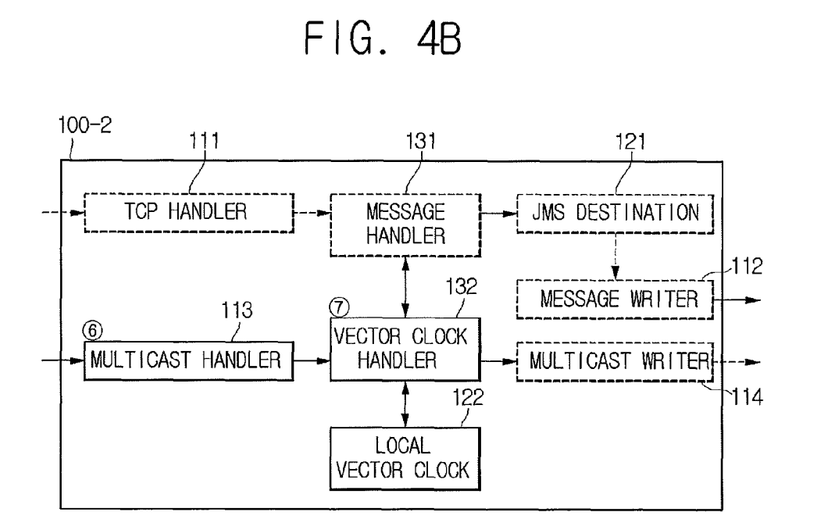

FIGS. 4A and 4B are block diagrams showing a course of assigning order to a JMS message by using a vector clock with a first server and a second one in accordance with one example embodiment of the present invention.

As the configurations and the operations of a first server 100-1 and a second server 100-2 are basically same, explanation on the first server 100-1 is same as that on the second server 100-2, and vice versa. For convenience of explanation, the operation of the first server 100-1 and that of the second server 100-2 will be separately explained below.

By referring to FIGS. 4A and 4B, the first server 100-1 and the second server 100-2 in accordance with one example embodiment of the present invention could include the communication part 110 of the server 100 in accordance with the example embodiment as stated above. Taking a closer look at the components of the communication part 110, a TCP handler 111, a message writer 112, a multicast handler 113, and a multicast writer 114 could be included.

The TCP handler 111 may acquire messages from clients through a network and the message writer 112 may deliver a message in the earliest relative order to a client which has requested the message. Besides, the multicast handler 113 may receive vector clocks transmitted from other servers in a multicast method, and the multicast writer 114 may transmit vector clocks to other servers in the multicast method. Each component could be comprised of separate hardware chips or one hardware chip such as a network interface card (NIC) as well. In addition, the TCP handler 111 and the message writer 112 could be made up of one chip and the multicast handler 113 and the multicast writer 114 could be comprised of a chip different from the above-mentioned chip.

In accordance with one example embodiment of the present invention, the first server 100-1 and the second server 100-2 may include a JMS destination 121 for storing an acquired message and a local vector clock 122 for storing a vector clock, instead of the storage unit 120 of the server 100 in accordance with the example embodiment.

When the acquired message is determined to be stored in the JMS destination 121, an increased vector clock (a so-called first clock) could be also assigned to the acquired message and stored with the acquired message. If there is any vector clock (a so-called second clock) received from any other server, the second vector clock together with the first vector clock could also be assigned to the message and stored with the acquired message.

The local vector clocks 122 of the first server 100-1 and the second server 100-2 may do, or support to do, store the vector clocks of the first server 100-1 and the second server 100-2 and those received from other servers. The vector clocks, if being received from any of other servers, may be updated and stored and their own vector clocks may be increased and stored under the vector clock algorithm.

In accordance with one example embodiment of the present invention, the first server 100-1 and the second server 100-2 may include the handler processor 130 of the server 100 as mentioned above. More specifically, the handler processor 130 may include a message handler 131 and a vector clock handler 132.

By referring to FIG. 4A, if a message is acquired by the TCP handler 111 (at a step of ①), the message handler 131 of the first server 100-1 may determine whether the acquired message is required to be assigned relative order (at a step of ②). If the acquired message is determined not to be required to be assigned the relative order, the message handler 131 of the first server 100-1 may store the acquired message in the JMS destination 121. However, if the acquired message is determined to be required to be assigned the relative order, the vector clock handler 132 of the first server 100-1 may generate an internal event in the local vector clock 122. If the internal event is generated, the vector clock handler 132 of the first server 100-1 may increase a vector clock stored and managed by the local vector clock 122 and store it again in the local vector clock 122 and then give the increased vector clock to the acquired message (at a step of ③). In addition, the message handler 131 of the first server 100-1 may store the message to which the increased vector clock is assigned in the JMS destination 121 (at a step of ④). For reference, the message handler 131 of the first server 100-1 may determine whether the acquired message is required to be assigned the relative order by referring to the status information included in the acquired message as shown in FIG. 3 as stated above.

Moreover, the vector clock handler 132 of the first server 100-1 may cause the multicast writer 114 to transmit the increased vector clock to at least one of other servers (including the second server) connected with the server 100 through the network by the multicast method (at a step of ⑤). In the case, the multicast handler 113 of the second server 100-2 as shown in FIG. 4B may acquire the increased vector clock transmitted by the first server 100-1 as a received event (at a step of ⑥). Just like the first server 100-1, the second server 100-2 also holds its vector clock in the local vector clock 122. If the vector clock of the first server 100-1 has been already stored in the local vector clock 122 of the second server 100-2, the vector clock handler 132 of the second server 100-2 may update the vector clock of the first server 100-1 stored in the local vector clock 122 of the second server 100-2 and store it. However, if the vector clock of the first server 100-1 is not stored in the local vector clock 122 of the second server 100-2, the vector clock of the first server 100-1 may be newly stored in the local vector clock 122 of the second server 100-2. The vector clock handler 132 of the second server 100-2 may increase its vector clock and store its increased vector clock together with the vector clock of the first server 100-1 in the local vector clock 122 (at a step of ⑦). If newly acquiring a message after that, the second server 100-2 may give its own vector clock and the vector clock of the first server 100-1 stored in itself to the newly acquired message.

Figure 5A:
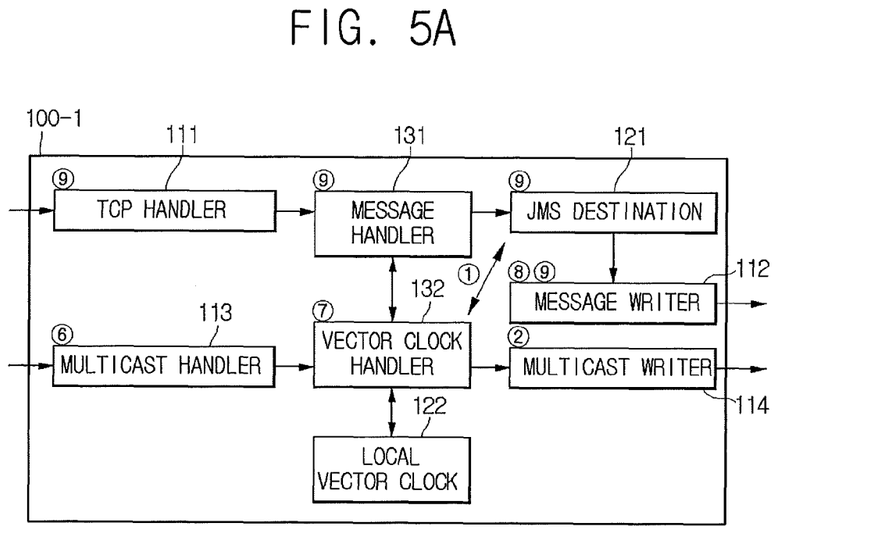
FIGS. 5A and 5B are block diagrams showing a course of delivering a JMS message to a user in regular order by using a first server and a second one in accordance with one example embodiment of the present invention.
Figure 5B:
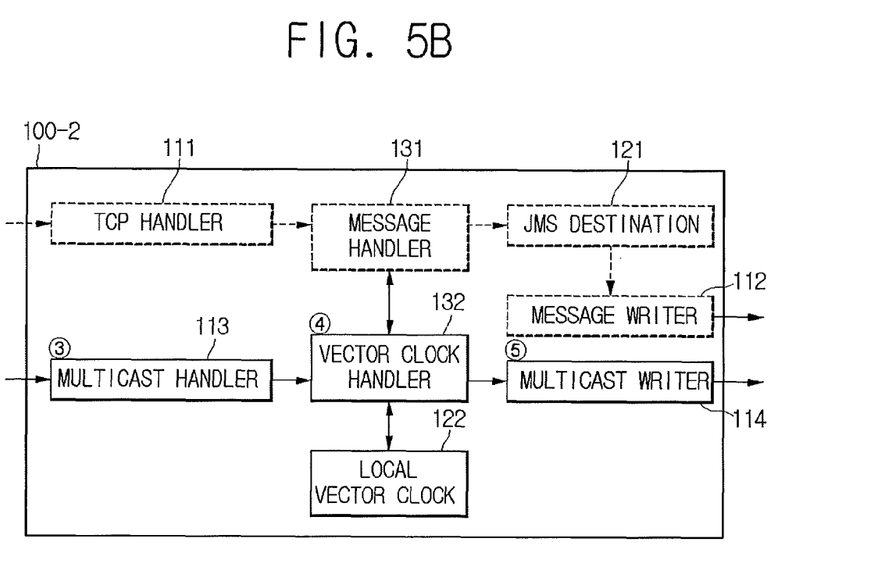

FIGS. 5A and 5B are block diagrams showing a course of delivering a JMS message in regular order to a user by using a first server and a second one in accordance with one example embodiment of the present invention.

As the components of each server illustrated in FIGS. 5A and 5B are same as those in FIGS. 4A and 4B, the detailed explanation thereon will be omitted and only the part which has not been explained in details in FIGS. 4A and 4B will be mentioned.

By referring to FIG. 5A, if a request for a message is received from a client, the vector clock handler 132 of the first server 100-1 may determine whether the message stored in the JMS destination 121 is allowed to be delivered to the client (at a step of ①). For example, the vector clock handler 132 of the first server 100-1 may determine whether the message stored in the JMS destination 121 is a message to which the vector clock in the relative order is assigned. The multicast writer 114 of the first server 100-1 may transmit information on the vector clock corresponding to a message (so-called a specific message) with a vector clock in the earliest relative order among at least one of messages stored in the JMS destination 121 of the first server 100-1 to at least one of other servers (including the second server) connected with the first server 100-1 through the network (at a step of ②). Furthermore, the multicast writer 114 of the first server 100-1 may ask whether a message with a vector clock in earlier relative order than the specific message stored in the JMS destination 121 exists in the second server 100-2 to multiple other servers in the distributed server system including the second server 100-2 by the multicast method. At the time, the multicast handler 113 of the second server 100-2 may receive information on the vector clock and information on the request (at a step of ③). If it is determined that a message with a vector clock in earlier relative order than the specific message does not exist in the second server 100-2 by comparing the received vector clock corresponding to the specific message with the vector clock in the earliest relative order among vector clocks of messages stored in the JMS destination 120, the vector clock handler 132 of the second server 100-2 may notify the first server 100-1 of the information through the multicast writer 114 (at a step of ⑤). In the case, the vector clock handler 132 of the first server 100-1 may cause the multicast handler 113 to receive the information (at steps of ⑥ and ⑦) and may set a flag in a meaning of the deliverable status to the specific message and deliver the specific message with the flag to the client through the message writer 112 (at a step of ⑧). Of course, for convenience of explanation, explanation was made on assumption that a feedback is received from the second server 100-2, but the feedback can be received even from a third server, a fourth one, etc. after multicasting is performed. Only when it is fed back that there is no message with a vector clock in earlier relative order than the specific message from such other servers, e.g., the second server, the third server, the fourth one, etc., the flag in the meaning of the deliverable status could be set to the specific message and the specific message to which the flag has been attached could be transmitted to the client through the message writer 112.

If the flag in the meaning of the deliverable status is set to the specific message, the message handler 131 of the first server 100-1 may provide the specific message to the client through the message writer 112. As such, the reason that the flag is set to the specific message is to prevent the relative order of the vector clock corresponding to the specific message from being repeatedly calculated again if the client returns the specific message without using the specific message. In the case, the returned specific message may be stored again in the JMS destination 121 of the first server 100-1. After that, if the client requests the specific message again, the message handler 131 may cause the message writer 112 to provide the specific message stored in the JMS destination 121 to the client without a course of calculating the relative order thereof.

Meanwhile, if a certain message with a vector clock in earlier relative order than the specific message stored in the JMS destination 121 of the first server 100-1 is determined to exist in the second server 100-2, the message writer 112 of the second server 100-2 may provide the certain message to the first server 100-1. In addition, the TCP handler 111 of the first server 100-1 may acquire the certain message in earlier relative order from the second server 100-2. The message handler 131 of the first server 100-1 may provide the certain message received from the second server 100-2 to the client through the message writer 112 (at a step of ⑨). At the time, the second server 100-2 may provide the first server 100-1 with information on the vector clock of the certain message. If the first server 100-1 receives two or more messages from other servers, the first server 100-1 may compare vector clocks of the two or more messages among each other and finally deliver a message with the highest priority to the client.

Figure 6:
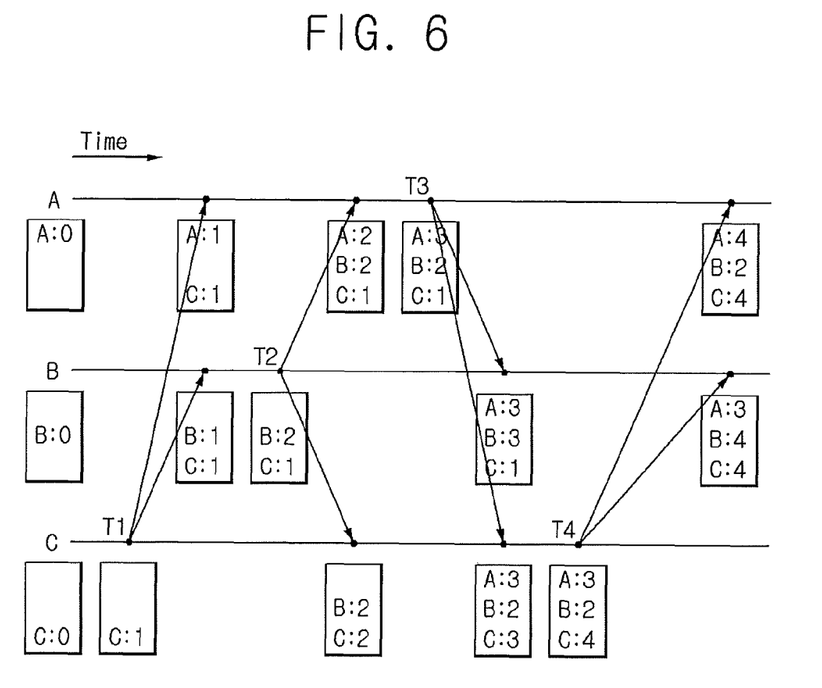
FIG. 6 is a drawing illustrating a detailed example embodiment of assigning vector clocks to messages and transmitting a specific message with the highest priority among the messages based on the assigned vector clocks in accordance with one example embodiment of the present invention.

FIG. 6 is a drawing illustrating a detailed example embodiment of assigning vector clocks to messages and transmitting a message with the highest priority based on the assigned vector clocks in accordance with one example embodiment of the present invention.

FIG. 6 illustrates that three servers A, B and C are included in the distributed server system. Initially, a clock of each server is set to 0. It illustrates that a new message is acquired in the server C at time T1. The server C increases its vector clock C by 1 and then gives it to the new message. Then, the server C multicasts its vector clock C to other servers. The servers A and B which receive the vector clock C check whether they have already stored the vector C. Because neither of the two servers stores the vector clock C, they store the vector clock C as it is and increase their vector clocks by 1 and then store them. At the point of time, it can be found that the server A allocates 1 to vector clocks A and C, respectively, and the server B allocates 1 to vector clocks B and C, respectively.

After that, a new message is acquired in the server B at time T2. The server B increases its vector clock B by 1 to be 2 and then assign the increased vector clock B and the vector clock C to the new message. Then, the server B multicasts the increased vector clock B and the vector clock C to other servers. The servers A and C, which receive the vectors B and C, check whether they have already stored the vector clocks B and C. As the server A has stored the vector clock C, the server A updates the vector clock C to be 1 and increase its vector clock A by 1 to be 2. Besides, the vector clock B is newly stored because it has not been stored in the server A. As the server C has the vector clock B, the server C updates the vector clock B. In addition, the server C increases its vector clock C by 1 and then stores it.

After that, a new message is acquired in the server A at time T3. The server A increases its vector clock A by 1 to be 3 and then assign the increased vector clock A and the vector clocks B and C to the new message. Then, the server A multicasts the increased vector clock A and the vector clocks B and C to other servers. The servers B and C, which receive the increased vector clock A and the vector clocks B and C may check whether they have stored the vector clocks A, B, and C. Because the server B does not have the vector clock A, the server B newly stores the vector clock A. Further, because the server B has stored the vector clock C, the server B updates the vector clock C to be 1. Moreover, the server B increases its vector clock B by 1 to be 3 and then store it. Meanwhile, because the server C has had the vector clock B, the server C updates it as a new value. Further, because the server C does not have the vector clock A, the server C stores the vector clock A and increases its vector clock C by 1 to 3 and then stores it.

It is shown that a new message is acquired again in the server C at time T4 and similarly, the vector clocks of each server may be updated or increased.

Now, suppose that there is a request for a message from the client to the server A. The server A selects a message with a vector clock in the earliest relative order among its messages stored therein. In FIG. 6, as the server A stores only one message acquired at the time T3, the server A multicasts information on a vector clock of the message acquired at the time T3 to other servers and requests whether there is a message with higher priority than the message acquired at the time T3. The relative order is determined by comparing vector clocks assigned to the messages. For example, as the vector clocks of the message acquired by the server A at the time T3 are the vector clock A=3, the vector clock B=2, and the vector clock C=1, and the values of the individual variables are less than, or equal to, the vector clocks, i.e., the vector clock A=3, the vector clock B=2, and the vector clock C=4, of the message acquired by the server C at the time T4, it could be determined that the message acquired by the server A at the time T3 has higher priority than the message acquired by the server C at the time T4. If any of the vector clock values of a specific message is greater than those of a target message, whether the specific message has higher priority than the specific message cannot be determined. In FIG. 6, as the vector clocks of the message acquired by the server C at the time T1 and those by the server B at the time T2 are less than those of the message acquired by the server A at the time T3, the messages acquired by the serves B and C can be seen as messages in earlier relative order than the message acquired by the server A at the time T3. Finally, the servers B and C will deliver the messages to the server A, which will provide the message of the server C which has the highest priority among the received messages to the client.

In accordance with the present invention, there are effects as shown below.

The present invention has an effect of being capable of transmitting a message effectively even under a large-scale distributed server environment by determining relative order of messages and ensuring that a client receives the messages depending on the relative order.

Besides, the present invention has another effect of being capable of transmitting a message effectively even under the large-scale distributed server environment by replacing a message sent to a server by the client with a vector clock event and assigning the relative order to the message.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled person in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case.

As seen above, the present invention has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method for assigning relative order to messages by using vector clocks under a distributed server environment, the distributed server environment comprising at least two servers, wherein the method comprising the steps of:
    (a0) a first server among the at least two servers acquiring a first message through a network; and
    (a1) determining whether the acquired first message is required to be assigned relative order by referring to status information included in the acquired first message
    (a) the first server assigning a vector clock associated with the first server to the first message and storing the first message to which the vector clock is assigned when the first message required to be assigned relative order is acquired through the network; and
    (b) the first server transmitting an increased vector clock associated with the first server to other servers except the first server among the at least two servers connected with the first server through the network in response to receiving the first message required to be assigned relative order and causing said other servers except the first server to store the increased vector clock associated with the first server and increase vector clocks associated with said other servers except the first server in response to receiving the increased vector clock associated with the first server,
    wherein, after the step of (b), if a second server among the at least two servers newly acquires a second message which is required to be assigned relative order, the second server assigns a vector clock associated with the second server and the increased vector clock associated with the first server to the second message and transmits an increased vector clock associated with the second server to other servers except the second server among the at least two servers and causing said other servers except the second server to store the increased vector clock associated with the second server and increase vector clocks associated with said other servers except the second server in response to receiving the increased vector clock associated with the second server.

2. The method of claim 1, wherein, at the step of (a), the first server generates an internal event to the vector clock associated with the first server, and at the step of (b), the first server transmits the increased vector clock associated with the first server to said other servers except the first server through the network and supports said other servers except the first server to generate a received event.

3. The method of claim 1, wherein, at the step of (b), the first server transmits the increased vector clock associated with the first server to said other servers except the first server connected with the first server by a multicast method.

4. The method of claim 1, comprising the steps of:
    (c) a specific server selected from the first server or the second server, if receiving a request for a message from a client, transmitting a vector clock associated with the specific server and vector clocks associated, with other servers except the specific server, which have been assigned to a specific message having an earliest relative order among at least one of the specific server's messages, to said other servers except the specific server among the at least two servers and asking said other servers except the specific server whether there is any message with vector clocks in earlier relative order than the specific message in at least one of said other servers except the specific server; and
    (d) the specific server providing the specific message to the client, if it is determined that there is no message with vector clocks in earlier relative order than the specific message in said other servers except the specific server,
    wherein, at the step of (d), when it is determined that there is a certain message with vector clocks in earlier relative order than the specific message in at least one of said other servers except the specific server, the specific server acquires the certain message in earlier relative order from the at least one of said other servers except the specific server and provides the certain message to the client.

5. The method of claim 4, wherein, at the step of (d), after a flag in the meaning of a deliverable status is set to the specific message, the specific message with the flag is delivered to the client.

6. A first server for assigning relative order to messages by using vector clocks in a distributed server environment comprising at least two servers including the said server, the said first server comprising:
    a handler processor;
    a communication part for communicating with one or more other servers connected with the first server through a network, said communication part acquiring a first message through the network; and
    a storage unit for storing one or more messages and vector clocks;
    wherein the handler processor of the first server among the at least two servers determines whether the first message is required to be assigned relative order by referring to status information included in the acquired first message and (i) assigns a vector clock associated with the first server and stored in the storage unit to the first message to which the relative order is required to be assigned when the first message is acquired through the network, and (ii) causes the communication part to transmit an increased vector clock associated with the first sever to said other servers except the first server among the at least two servers connected with the first server through the network in response to receiving the first message required to be assigned relative order causing said other servers except for the first server to store the increased vector clock associated with the first server and increase vector clocks associated with said other servers except for the first server in response to receiving the increased vector clock associated with the first server, wherein after (ii), if a second server among the at least two servers newly acquires a second message which is required to be assigned relative order, the second server assigns a vector clock associated with the second server and the increased vector clock associated with the first server to the second message and transmits an increased vector clock associated with the second server to other servers except the second server among the at least two servers and causing said other servers except the second server to store the increased vector clock associated with the second server and increase vector clocks associated with said other servers except the second server in response to receiving the increased vector clock associated with the second server.

7. The server of claim 6, wherein, at (i), the handler processor generates an internal event to the vector clock associated with the first server; and at (ii), the communication part supports said other servers except the first server to generate a received event by transmitting the increased vector clock associated with the first sever to said other servers except the first server.

8. The server of claim 6, wherein the communication part transmits the increased vector clock associated with the first server to said other servers except the first server by a multicast method.

9. The server of claim 6, wherein
(iii) a specific server selected from the first server or the second server, if receiving a request for a message from a client, allows the communication part to transmit a vector clock associated with the specific server and vector clocks associated with other servers except for the specific server, which have been assigned to a specific message clock having an earliest relative order among at least one of the specific server's messages, stored in the storage unit to said other servers except the specific server and asks said other servers except the specific server whether there is any message with vector clocks in earlier relative order than the specific message in at least one of said other servers except the specific server; and
(iv) the specific server causes the communication part to provide the specific message to the client, when it is determined that there is no message with vector clocks in earlier relative order than the specific message in said other servers except for the specific server;
wherein, at the step of (iv), when it is determined that there is a certain message with vector clocks in earlier relative order than the specific message in at least one of said other servers except for the specific server, the specific server acquires the certain message in earlier relative order from the at least one of said other servers except the specific server and provides the certain message to the client.

10. The server of claim 9, wherein the handler processor sets a flag in a meaning of a deliverable status to the specific message and then the specific message with the flag is delivered to the client.

\* \* \* \* \*